(12) United States Patent
Zhang et al.

(10) Patent No.: US 10,666,135 B2
(45) Date of Patent: *May 26, 2020

(54) BALANCING CHARGE PUMP CIRCUITS

(71) Applicant: Linear Technology LLC, Milpitas, CA (US)

(72) Inventors: Xu Zhang, Milpitas, CA (US); Jian Li, San Jose, CA (US); San Hwa Chee, San Ramon, CA (US)

(73) Assignee: Linear Technology LLC, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,594

(22) Filed: Jun. 11, 2018

(65) Prior Publication Data

US 2018/0294717 A1 Oct. 11, 2018

Related U.S. Application Data

(63) Continuation of application No. 15/465,339, filed on Mar. 21, 2017, now Pat. No. 9,998,000.

(Continued)

(51) Int. Cl.
*H02M 3/07* (2006.01)
*G05F 3/08* (2006.01)
(Continued)

(52) U.S. Cl.
CPC ............... *H02M 3/07* (2013.01); *H02M 1/08* (2013.01); *H02M 1/36* (2013.01); *H02M 3/073* (2013.01); *H02M 2003/072* (2013.01)

(58) Field of Classification Search
CPC .. H02M 2003/072; H02M 3/07; H02M 3/073; H02M 3/06; G05F 3/08;
(Continued)

(56) References Cited

U.S. PATENT DOCUMENTS 5,581,454 A 12/1996 Collins
5,598,118 A 1/1997 Koifman et al.
(Continued)

FOREIGN PATENT DOCUMENTS

CN 105576964 A 5/2016
CN 105634267 A 6/2016
(Continued)

OTHER PUBLICATIONS

"U.S. Appl. No. 15/465,339, Notice of Allowance dated Feb. 14, 2018", 9 pgs.

(Continued)

*Primary Examiner* — An T Luu
(74) *Attorney, Agent, or Firm* — Schwegman Lundberg & Woessner, P.A.

(57) ABSTRACT

Methods and systems of controlling a switched capacitor converter are provided. Upon determining that a voltage across a flying capacitor is above a first threshold, a first current is drawn from a first terminal of the flying capacitor by a first current source, and a second current is provided to a second terminal of the flying capacitor by a second current source. Upon determining that the voltage across the flying capacitor is below a second threshold, the first current is provided to the first terminal of the flying capacitor by the first current source, and the second current is drawn from the second terminal of the flying capacitor by the second current source. Upon determining that the voltage across the flying capacitor is above the second threshold and below the first threshold from the reference voltage, the first and second current sources are turned OFF.

20 Claims, 6 Drawing Sheets

Related U.S. Application Data

(60) Provisional application No. 62/363,025, filed on Jul. 15, 2016.

(51) Int. Cl.
*H02M 1/36* (2007.01)
*H02M 1/08* (2006.01)

(58) Field of Classification Search
CPC ...... G05F 3/10; H03H 19/004; H03H 19/008; H03H 11/1291; H03H 11/12; H03F 3/005; H03F 3/345
See application file for complete search history.

(56) References Cited

U.S. PATENT DOCUMENTS

| | | | |
|---|---|---|---|
| 5,900,722 | A | 5/1999 | Scott et al. |
| 6,657,875 | B1 | 12/2003 | Zeng et al. |
| 6,788,039 | B2 | 9/2004 | Abdoulin |
| 7,652,534 | B1 | 1/2010 | Lin et al. |
| 7,696,735 | B2 | 4/2010 | Oraw et al. |
| 7,893,752 | B2 | 2/2011 | Tanaka |
| 8,427,113 | B2 | 4/2013 | Xing et al. |
| 8,503,203 | B1 | 8/2013 | Szczeszynski et al. |
| 8,710,903 | B2 | 4/2014 | Oraw et al. |
| 8,724,353 | B1 | 5/2014 | Giuliano et al. |
| 9,484,799 | B2 * | 11/2016 | Zhang ............ H02M 3/158 |
| 9,998,000 | B2 | 6/2018 | Zhang et al. |
| 2003/0007373 | A1 | 1/2003 | Satoh |
| 2004/0004851 | A1 | 1/2004 | Itoh |
| 2006/0087297 | A1 | 4/2006 | Deng |
| 2006/0109205 | A1 | 5/2006 | Deng |
| 2007/0053216 | A1 | 3/2007 | Alenin |
| 2008/0084720 | A1 | 4/2008 | Thiele et al. |
| 2008/0150620 | A1 | 6/2008 | Lesso |
| 2008/0258701 | A1 | 10/2008 | Liu et al. |
| 2009/0072800 | A1 | 3/2009 | Ramadass et al. |
| 2009/0315615 | A1 | 12/2009 | Likhterov |
| 2009/0322384 | A1 | 12/2009 | Oraw et al. |
| 2010/0080023 | A1 | 4/2010 | Jain |
| 2010/0201337 | A1 | 8/2010 | Bradbury |
| 2011/0109376 | A1 | 5/2011 | Li |
| 2012/0153912 | A1 | 6/2012 | Demski et al. |
| 2012/0154013 | A1 | 6/2012 | Mera et al. |
| 2014/0117964 | A1 | 5/2014 | Walters et al. |
| 2014/0266134 | A1 | 9/2014 | Zhak et al. |
| 2014/0306674 | A1 | 10/2014 | Kondou |
| 2014/0327479 | A1 | 11/2014 | Giuliano et al. |
| 2014/0375291 | A1 | 12/2014 | Tomasz et al. |
| 2015/0207401 | A1 | 7/2015 | Zhang et al. |
| 2015/0226556 | A1 | 8/2015 | Aaltonen |
| 2015/0288335 | A1 | 10/2015 | Hyerby |
| 2015/0309518 | A1 | 10/2015 | Nagda et al. |
| 2015/0333744 | A1 | 11/2015 | Chang |
| 2016/0118905 | A1 | 4/2016 | Freeman et al. |
| 2016/0126851 | A1 | 5/2016 | Freeman et al. |
| 2017/0214318 | A1 | 7/2017 | Takenaka |
| 2017/0353105 | A1 | 12/2017 | Solie et al. |
| 2018/0019665 | A1 | 1/2018 | Zhang et al. |
| 2018/0019666 | A1 | 1/2018 | Zhang et al. |
| 2018/0019669 | A1 | 1/2018 | Zhang et al. |

FOREIGN PATENT DOCUMENTS

| | | |
|---|---|---|
| CN | 105656307 A | 6/2016 |
| CN | 105720813 A | 6/2016 |
| CN | 105763040 A | 7/2016 |
| EP | 2804302 A1 | 11/2014 |
| JP | 2014033614 A | 2/2014 |
| JP | 5951786 B2 | 6/2016 |
| TW | 200608674 A | 3/2006 |
| TW | 200844704 A | 11/2008 |
| TW | 201345132 A | 11/2013 |
| TW | 201428444 A | 7/2014 |
| TW | 201530998 A | 8/2015 |
| WO | WO-2012054736 A2 | 4/2012 |
| WO | WO-2012132439 A1 | 10/2012 |
| WO | WO-2016105905 A1 | 6/2016 |
| WO | WO-2018013183 A1 | 1/2018 |
| WO | WO-2018013184 A1 | 1/2018 |
| WO | WO-2018013185 A1 | 1/2018 |

OTHER PUBLICATIONS

"U.S. Appl. No. 15/465,487, 312 Amendment filed Jul. 19, 2018", 10 pgs.

"U.S. Appl. No. 15/465,487, Non Final Office Action dated Jan. 3, 2018", 6 pgs.

"U.S. Appl. No. 15/465,487, Non Final Office Action dated Sep. 13, 2018", 6 pgs.

"U.S. Appl. No. 15/465,487, Notice of Allowance dated Jan. 3, 2019", 7 pgs.

"U.S. Appl. No. 15/465,487, Notice of Allowance dated Apr. 25, 2018", 7 pgs.

"U.S. Appl. No. 15/465,487, Response filed Mar. 18, 2018 to Non Final Office Action dated Jan. 3, 2018", 8 pgs.

"U.S. Appl. No. 15/465,487, Response filed Dec. 10, 2018 to Non Final Office Action dated Sep. 13, 2018", 10 pgs.

"U.S. Appl. No. 15/465,504, 312 Amendment filed Jul. 19, 2018", 11 pgs.

"U.S. Appl. No. 15/465,504, Amendment filed Jul. 25, 2018", 12 pgs.

"U.S. Appl. No. 15/465,504, Examiner Interview Summary dated Mar. 22, 2018", 3 pgs.

"U.S. Appl. No. 15/465,504, Non Final Office Action dated Dec. 28, 2017", 12 pgs.

"U.S. Appl. No. 15/465,504, Notice of Allowance dated May 4, 2018", 7 pgs.

"U.S. Appl. No. 15/465,504, Notice of Allowance dated Nov. 13, 2018", 7 pgs.

"U.S. Appl. No. 15/465,504, Notice of Non-Compliant Amendment dated Aug. 7, 2018", 3 pgs.

"U.S. Appl. No. 15/465,504, Preliminary Amendment filed Sep. 13, 2018", 11 pgs.

"U.S. Appl. No. 15/465,504, Response filed Mar. 18, 2018 to Non Final Office Action dated Dec. 28, 2017", 11 pgs.

"U.S. Appl. No. 15/465,504, Response filed Sep. 13, 2018 to Notice of Non-Compliant Amendment dated Aug. 7, 2018", 11 pgs.

"Balancing Charge Pump Circuits", U.S. Appl. No. 15/465,339, filed Mar. 21, 2017, 33 pgs.

"Balancing Techniques and Circuits for Charge Pumps", U.S. Appl. No. 15/465,487, filed Mar. 21, 2017, 48 pgs.

"Driving Charge Pump Circuits", U.S. Appl. No. 15/465,504, filed Mar. 21, 2017, 46 pgs.

"Taiwanese Application Serial No. 106116577, Office Action dated Oct. 16, 2018", w/ English translation, 7 pgs.

"Taiwanese Application Serial No. 106116594, Office Action dated Aug. 29, 2018", W/English Translation, 18 pgs.

"Taiwanese Application Serial No. 106116594, Response filed Nov. 29, 2018 to Office Action dated Aug. 29, 2018", w/ English Claims, 94 pgs.

"U.S. Appl. No. 15/465,504, Response filed Jan. 24, 2019 to Notice of Allowance dated Nov. 13, 2018", 11 pgs.

"Taiwanese Application Serial No. 106116577, Response Filed Jan. 14, 2019 to Office Action dated Oct. 16, 2018", w/English Claims, 76 pgs.

"Taiwanese Application Serial No. 106116593, Office Action dated Jan. 3, 2019", w/ English Translation, 20 pgs.

International Search Report and Written Opinion from PCT/US2017/23466, dated Jun. 21, 2017, 9 pages.

International Search Report and Written Opinion from PCT/U52017/23468, dated Jun. 16, 2017, 8 pages.

International Search Report and Written Opinion from PCT/US2017/23469, dated Jun. 12, 2017, 9 pages.

"European Application Serial No. 17828091.3, Extended European Search Report dated Feb. 20, 2020", 7 pgs.

(56) References Cited

OTHER PUBLICATIONS

"European Application Serial No. 17828092.1, Extended European Search Report dated Feb. 20, 2020", 8 pgs.
"European Application Serial No. 17828093.9, Extended European Search Report dated Feb. 21, 2020", 8 pgs.
Wha, Jeong In, et al., "1200V cascaded HVIC gate driver for three-level neutral-point-clamped inverter IPM", IEEE Applied Power Electronics Conference and Exposition (APEC), (Mar. 16, 2014), 617-628.

* cited by examiner

BALANCING CHARGE PUMP CIRCUITS

CROSS-REFERENCE TO RELATED APPLICATION

The present application claims benefit of priority under 35 U.S.C. § 120 as a continuation from U.S. patent application Ser. No. 15/465,339 entitled "Balancing Charge Pump Circuits," filed on Mar. 21, 2017, which claims the benefit of priority under 35 U.S.C. § 119 from U.S. Provisional Patent Application Ser. No. 62/363,025 entitled "Balancing and Driving Charge Pump Circuits," filed on Jul. 15, 2016, which are hereby incorporated by reference in their entirety for all purposes.

BACKGROUND

Technical Field

This disclosure generally relates to voltage converters. More particularly, the present disclosure relates to switched capacitor converter circuits that are more reliable.

Description of Related Art

A charge pump circuit is a type of switched capacitor circuit that may be used to convert a direct current (DC) input voltage to another DC voltage. A charge pump can be configured to generate an output voltage that is a multiple (e.g., 2, 3 . . . N times) the input voltage or if can set an output voltage that is a fraction thereof (e.g., ½, ⅓ . . . 1/N times of the input voltage). In some implementations, such circuit can also generate a negative output voltage from a positive input voltage. Since the charge pump circuit does not require inductors to do the voltage conversion, it is sometimes referred as an inductor-less DC/DC converter.

FIG. 1A illustrates a conventional switched capacitor converter circuit 100. In the example of FIG. 1A, the input voltage approximately equals 2 times the output voltage at steady state. In the example of FIG. 1A, the transistors, which by way of example only and not by way of limitation, are illustrated to be metal oxide semiconductor field effect transistors (MOSFETs) Q1 and Q3 (108 and 110), are turned ON and OFF in a way that is complimentary to transistors Q2 and Q4 (108 and 112), as illustrated in FIG. 1B. The transistors are shown to switch at around 50% duty cycle. As illustrated in FIG. 1B, during steady state operation, the transistors Q1-Q4 (106 to 112) are switched to cyclically charge and discharge capacitor 104, sometimes referred to as a flying capacitor $C_{FLY}$. By adding feedback to the circuit 100, transistors Q1 and Q4 (106 and 112) can be driven differently to generate an output voltage $V_{OUT}$ other than $V_{IN}/2$. For example, different duty ratios may be used to provide the flexibility of providing output voltages that are different factors (e.g., 0.75, 0.5, 0.25, etc.) of the input voltage. Also, by swapping the input and output nodes $V_{IN}$ and $V_{OUT}$, respectively, the output voltage may be a multiple of the input voltage. For simplicity, as used herein, the term "factor" includes the meaning of fraction and multiple.

In the example of FIG. 1A, when transistors Q1 106 and Q3 110 are ON, capacitors $C_{FLY}$ 104 and $C_{OUT}$ 114 are effectively connected in series, thereby charging $C_{FLY}$ 104 and $C_{OUT}$ 114 to approximately $V_{IN}/2$. The capacitors $C_{FLY}$ 104 and $C_{OUT}$ 114 are initially charged by the input voltage $V_{IN}$ at start-up, where the voltage across the nodes of $C_{FLY}$ 104 and $C_{OUT}$ 114 is at $V_{IN}/2$. Typically, capacitors are connected external to any controller package due to their large size. The switches Q1-Q4 (106 to 112) may also be external to the package to accommodate higher currents. The input voltage VIN 102 is directly connected to the top terminal of the transistor Q1 (108), where capacitor—$C_{FLY}$ 104 is connected to VIN 102 via transistor Q1 (106) when it is ON.

When the transistors Q2 108 and Q4 112 are ON, the capacitors $C_{FLY}$ 104 and $C_{OUT}$ 114 are in parallel. This arrangement forces the voltages across capacitors $C_{FLY}$ 104 and $C_{OUT}$ 114 to be substantially similar at approximately $V_{IN}/2$.

Charge pump circuits, similar to the switched capacitor converter circuit 100, may be subject to a large inrush current to sensitive circuit elements, such as transistors Q1 to Q4 (106 to 112). For example, the initial voltage across the capacitors, $C_{FLY}$ 104 and $C_{OUT}$ 114 may not be equal to $V_{IN}/2$ during startup or due to the presence of a fault condition during operation, collectively referred to herein as a transient state. In various scenarios, a fault condition may arise, for example, when a capacitor, such as $C_{OUT}$ 114, becomes a short circuit. Since there is no inductor in the switched capacitor converter circuit 100 to limit current, the input inrush current can rise quickly to a high level. In high current applications, this huge inrush current is exacerbated since very low ON-resistance MOSFETs may be used to implement transistors Q1 to Q4 (106 to 112) to achieve high power efficiency.

FIG. 1C is an example scenario that illustrates how, upon the $V_{IN}$ power supply powering up at time T0 (e.g., when the capacitors $C_{FLY}$ 104-$C_{OUT}$ 114 have a zero initial voltage), the in-rush current 130 may exceed 1000 A, depending on parasitic resistances in the path. The high current may last for a short time (e.g., less than 1 microsecond) but can nonetheless exceed the transistors' 106 to 112 safe operating current, thereby affecting the reliability of the switched capacitor converter circuit 100 in general, and the transistors 106 to 112 in particular. The output voltage $V_{OUT}$ reaches its steady state voltage after the capacitors $C_{FLY}$ 104 and $C_{OUT}$ 114 are fully charged and the switches Q1-Q4 (106 to 112) are controlled, as illustrated in the context of FIG. 1B. Further, there may be ringing 132 at the output voltage node $V_{OUT}$ after the inrush current, as illustrated in FIG. 1C, which may affect the load 116. During transient state (e.g., power-up or a fault condition), the voltages on the chip are not predictable because the voltages may not have been fully developed.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without ail of the components or steps that are illustrated. When the same numeral appears in different drawings, it refers to the same or like components or steps.

DETAILED DESCRIPTION OF ILLUSTRATIVE EMBODIMENTS

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings. Some embodiments may be practiced with additional components or steps and/or without all of the components or steps that are described.

The various methods and circuits disclosed herein generally relate to methods and circuits of providing fault protection for switched capacitor voltage converters. Both multiplying and dividing switched capacitor voltage converters are controlled by various pre-balance circuits such that large inrush currents are prevented, thereby providing a reliable operation of the switched capacitor voltage converters.

Figure 1B:
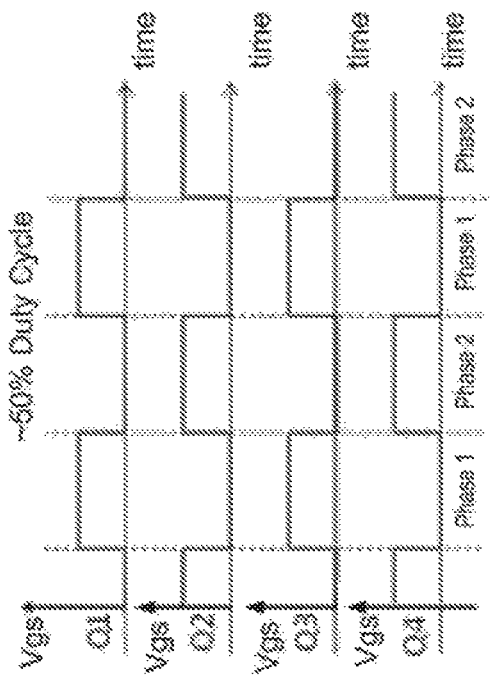
FIG. 1B illustrates example gate driver input waveforms of the transistors of the circuit of FIG. 1A.
Figure 1A:
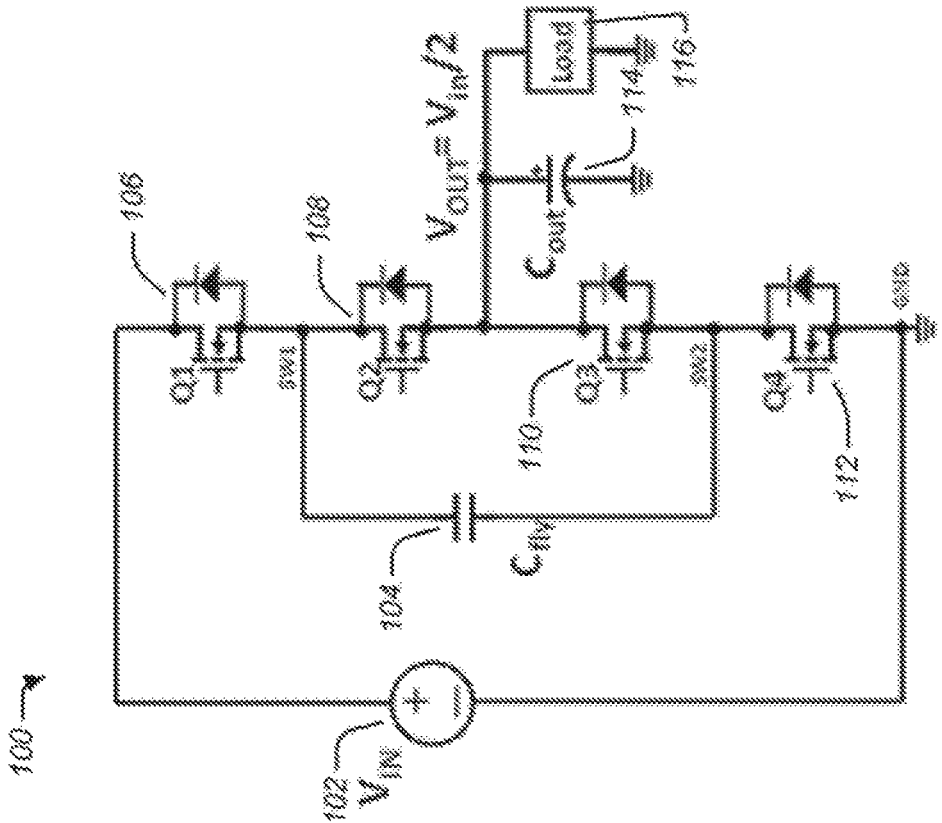
FIG. 1A illustrates a conventional switched capacitor converter circuit.
Figure 1C:
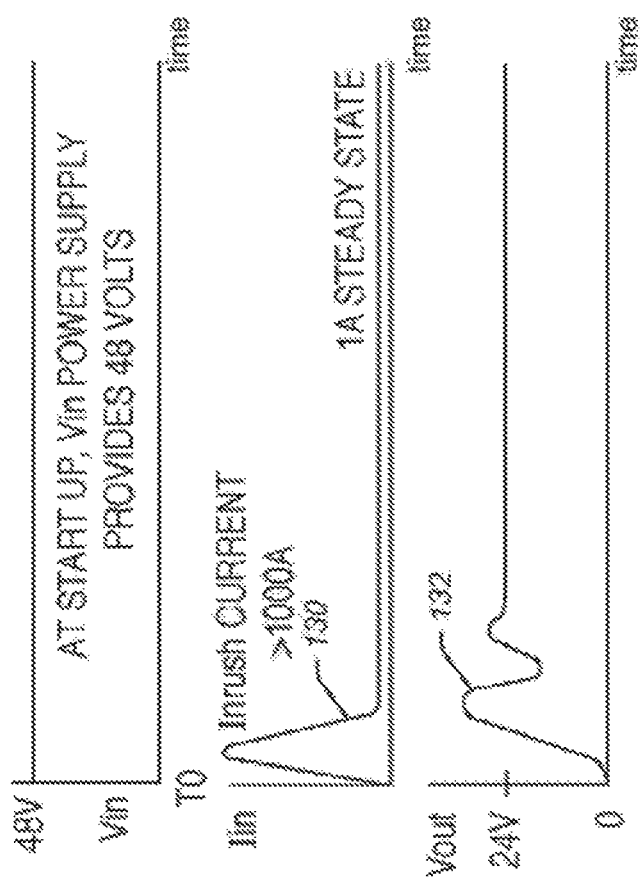
FIG. 1C illustrates example waveforms during a startup of the circuit of FIG. 1A.
Figure 2:
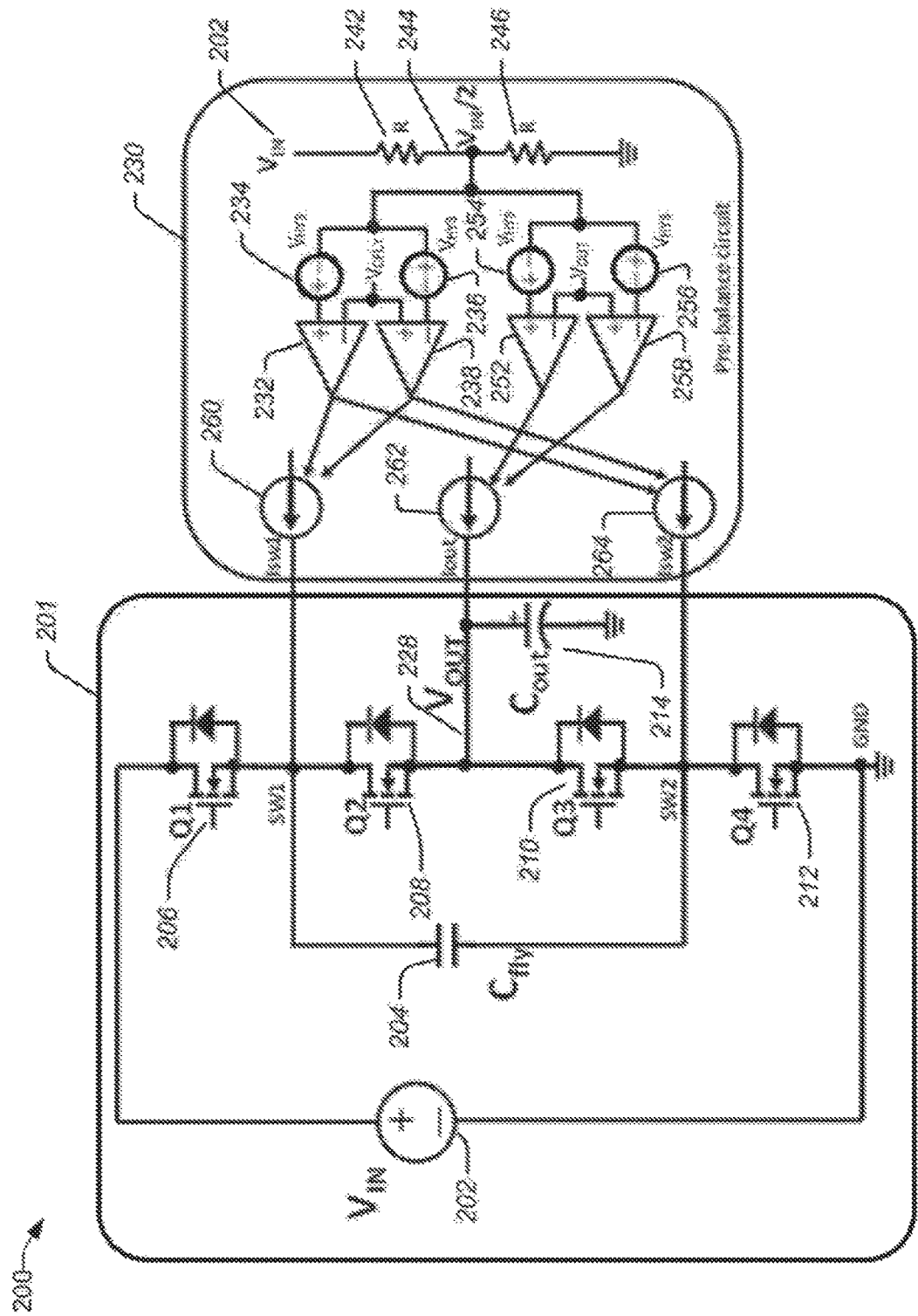
FIG. 2 is a switched capacitor converter circuit that is coupled to a pre-balance circuit, consistent with an illustrative embodiment.

FIG. 2 illustrates a switched capacitor converter circuit 201 that is coupled to a pre-balance circuit 230, consistent with an illustrative embodiment. The components of the switched capacitor converter circuit 201 are similar to those of FIG. 1A and are therefore not repeated here for brevity. The current through the transistors Q1 to Q4 (206 to 212) when the transistors Q1 to Q4 operates in the triode region and the capacitors $C_{FLY}$ 204 and $C_{OUT}$ 214 can be approximated by the equations below for both phases of operation:

Phase 1, $$I=(V_{IN}-V_{CFLY}(t)-V_{COUT}(t))/(R_{ON\_Q1}+R_{ON\_Q3}) \quad (EQ. 1)$$

Phase 2, $$I=(V_{CFLY}(t)-V_{COUT}(t))/(R_{ON\_Q2}+R_{ON\_Q4}) \quad (EQ. 2)$$

Where;
Phase 1 is when transistors Q1 and Q3 are ON, and Q2 and Q4 are OFF,
Phase 2 is when transistors Q2 and Q4 are ON, and Q1 and Q3 are OFF,
I is the current through a transistor that is ON,
$R_{ON}$ is the drain to source resistance of a transistor when it is ON,
$V_{CFLY}(t)$ is the voltage across the $C_{FLY}$ at time t and
$V_{COUT}(t)$ is the voltage across the $C_{OUT}$ time t, The drain to source resistance $R_{ON}$ of each transistor Q1 to Q4 (206 to 212) may have a very low ON resistance for better power efficiency. The lower the $R_{ON}$ of the corresponding transistor, the larger the inrush current may be, thereby providing a potential threat to the reliability of the switched capacitor converter circuit.

Applicants have identified that in view of equations 1 and 2 above, that if the voltages of capacitors $C_{FLY}$ 204 and $C_{OUT}$ 214 are controlled by the manner disclosed herein, the inrush current can be minimized. For example, if the following two conditions of equations 3 and 4 are met, then the inrush current is zero:

Condition 1:

$$V_{CFLY}(t=0)=V_{COUT}(t=0) \quad (EQ. 3)$$

Condition 2:

$$V_{IN}=V_{CFLY}(t=0)+V_{COUT}(t=0) \quad (EQ. 4)$$

In various embodiments, the inrush current can be limited to different pre-determined values based on the transistors' Q1 to Q4 (208 to 212) safety operation range. For example, different types of transistors have different tolerances for proper operation that does not lead to a premature reliability degradation of the transistor.

In one embodiment, assuming that the ON-resistance $R_{ON}$ of the transistors Q1 to Q4 (208 to 212) is the same and if the transistor (e.g., MOSFET) maximum safety current is $I_{MAX}$, equations 5 and 6 can provide conditions for safe operation of the capacitor converter circuit 201.

$$V_{IN}/2-2R_{ON}*I_{max}<V_{CFLY}(t=0)<V_{IN}/2+2R_{ON}*I_{max} \quad (EQ. 5)$$

$$V_{IN}/2-2R_{ON}*I_{max}<V_{COUT}(t=0)<V_{IN}/2+2R_{ON}*I_{max} \quad (EQ. 6)$$

Where:
$2R_{ON}*I_{max}$ is the pre-determined offset voltage $V_{HYS}$.

Hysteresis and the corresponding offset voltage is discussed in more detail later. The pre-balance circuit 230 is configured to pre-balance the voltage across capacitors $C_{FLY}$ 204 and $C_{OUT}$ 214 such that the conditions of equations 5 and 6 above are met when the switched capacitor converter circuit 201 is operative as a voltage divider charge pump. The pre-balancing of the pre-balancing circuit 230 may be performed during power-up or re-startup of the switched capacitor converter circuit 201.

In the example of FIG. 2, the pre-balance circuit includes three current sources 260, 262, and 264, which are able to sink or source current to nodes SW1, $-V_{OUT}$ 228, and SW2, respectively. The pre-balance circuit 230 includes a voltage divider, comprising a first resistance element 242 and a second resistance element 248 connected in series. The ratio of the first resistance element 242 to the second resistance element 246 may differ based on the voltage division to be achieved by the switched capacitor converter circuit 201. For example, for a divide by two charge pump configuration, the first resistance element 242 and the second resistance element 246 may be equal in resistance such that a voltage of $V_{IN}/2$ is provided at the voltage divider node 244. The voltage divider is configured to sample the input voltage $V_{IN}$ 202 and provide a scaled version thereof at node 244. The voltage at node 244 is used as a reference voltage for various components of the pre-balance circuit 230.

The pre-balance circuit includes a pair of comparators 232 and 238 configured to compare the voltage across the capacitor $C_{FLY}$ 204 with the reference voltage of node 244. In various embodiments, hysteresis may be added in order to provide a tolerance range for the comparators 232 and 238. To that end, a first hysteresis voltage source $V_{HYS}$ 234 provides a first hysteresis voltage $V_{HYS}$ to an input terminal of the first comparator 234. Similarly, a second hysteresis voltage source $V_{HYS}$ 236 is added to an input terminal of the second comparator 238. In various embodiments, the first hysteresis voltage may be equal in magnitude to the second hysteresis voltage or may be different, depending on the desired hysteresis tolerance range to be implemented for the pre-balance circuit 230. Put differently, the hysteresis voltage sources 234 and 236 provide threshold levels that, when exceeded, may trigger corrective action to pre-balance a switched capacitor converter circuit 201.

If the $V_{CFLY}$ voltage is out of a predetermined tolerance defined by the hysteresis voltage sources 234 and 236, then the pair of comparators 232 and 238 activate the first current source to provide a current to charge or sink the capacitor $C_{FLY}$ 204 and activate the second current source to draw current or source to the capacitor $C_{FLY}$ 204 such that the voltage across the capacitor $C_{FLY}$ 204 is controlled to be within the tolerance range discussed above.

The pre-balance circuit may also include a second pair of comparators 252 and 258 together providing a second comparator circuit that is configured to compare the voltage across capacitor $C_{OUT}$ 214 (i.e., the output voltage $V_{OUT}$ at node 228) with the reference voltage of node 244. Similar to the first pair of comparators 232 and 238 (i.e., the first comparator circuit), hysteresis may be added in order to provide a tolerance range for the comparators 252 and 258. To that ends a third hysteresis voltage source $V_{HYS}$ 254 provides a third hysteresis voltage $V_{HYS}$ to an input terminal of the first comparator $V_{HYS}$ 252. Similarly, a fourth hysteresis voltage source $V_{HYS}$ 256 provides a hysteresis voltage to a terminal of the comparator 258. In various embodiments, the third hysteresis voltage may be equal in magnitude to the fourth hysteresis voltage or may be different, depending on the desired hysteresis tolerance range to be implemented for the voltage across the output capacitance $C_{OUT}$ 214 of the pre-balance circuit 230.

If the $V_{OUT}$ voltage is out of a predetermined tolerance defined by the hysteresis voltage sources 254 and 256, then the second pair of comparators 252 and 258 activate the second current source to provide or sink current to adjust (e.g., charge/discharge) the output capacitor $C_{OUT}$ 214 such that the voltage across the output capacitor $C_{OUT}$ 214 is controlled to be within the tolerance range defined by the hysteresis voltage sources 254 and 256.

In one embodiment, during a capacitor voltage pre-balance phase, the transistors Q1 to Q4 (206 to 212) remain OFF and each current source 260, 262, and or 264 draws or sources current to nodes sw1, sw2, and $V_{OUT}$ based on the sensed voltage across the capacitors $C_{FLY}$ 204 and $C_{OUT}$ 214. The following equations provide conditions and polarity of each current source, respectively.

For current source $I_{OUT}$ 262:

$$V_{OUT} > (V_{IN}/2 + V_{HYS}) \quad (\text{EQ. 7})$$

Where: $I_{OUT}$ draws current from node $V_{OUT}$ 228.

$$(V_{IN}/2 - V_{HYS}) < V_{OUT} < (V_{IN}/2 + V_{HYS}) \quad (\text{EQ. 8})$$

Where: $I_{OUT}$ turned OFF.

$$V_{OUT} < (V_{IN}/2 - V_{HYS}) \quad (\text{EQ. 9})$$

Where: $I_{OUT}$ provides current to node $V_{OUT}$ 228.
For current sources $I_{SW1}$ 280 and $I_{SW2}$ 284:

$$V_{CFLY} > (V_{IN}/2 + V_{HYS}) \quad (\text{EQ. 10})$$

Where: $I_{SW1}$ draws current from node SW1 and $I_{SW2}$ provides current to node SW2.

$$(V_{IN}/2 - V_{hys}) < V_{CFLY} < (V_{IN}/2 + V_{hys}) \quad (\text{EQ. 11})$$

Where: $I_{SW1}$ and $I_{SW2}$ are OFF.

$$V_{CFLY} < (V_{IN}/2 - V_{hys}) \quad (\text{EQ. 12})$$

Where: $I_{SW1}$ provides current to nods SW1 and $I_{SW2}$ draws current from node SW2.

Figure 3A:
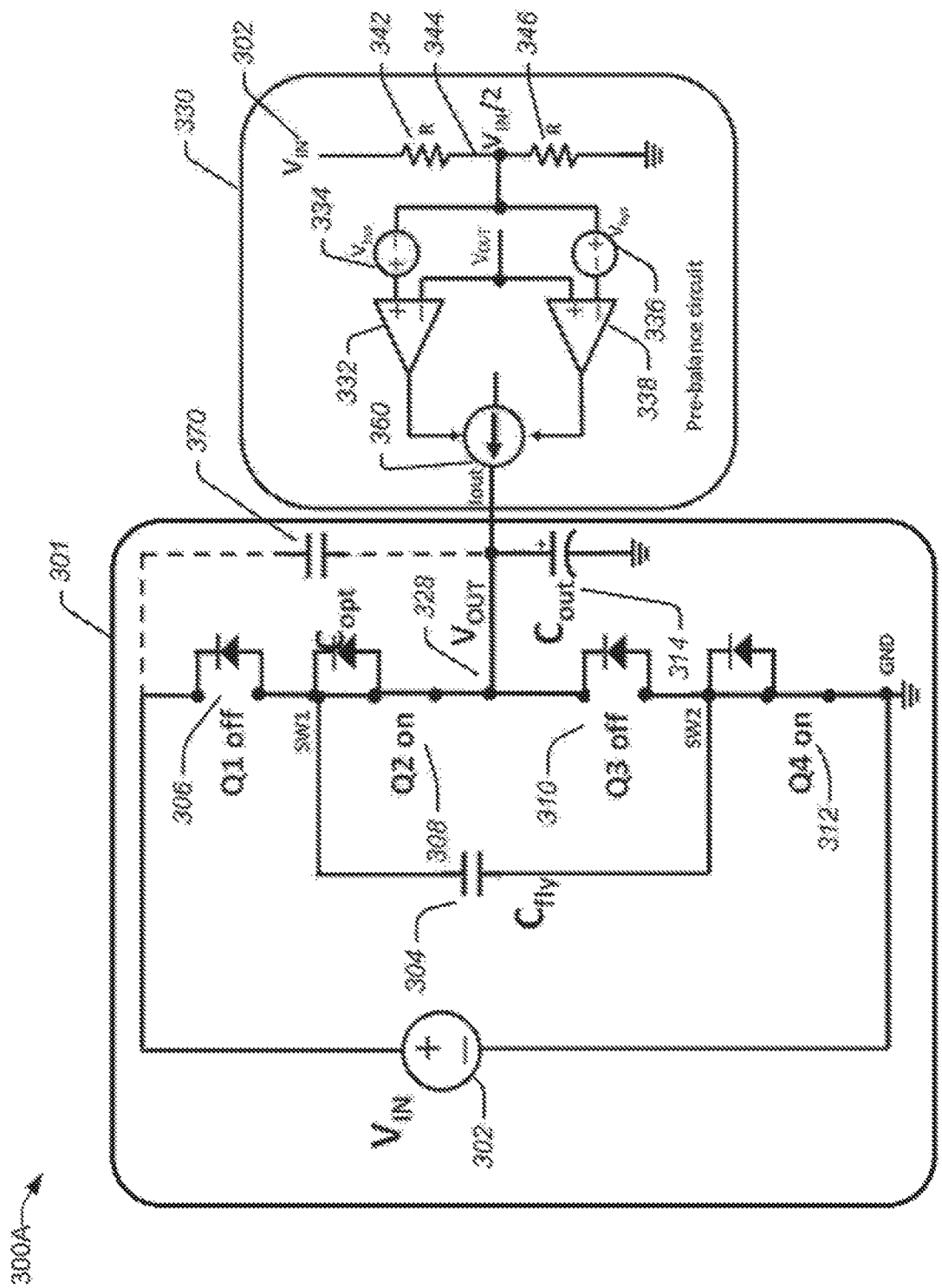
FIG. 3A is a switched capacitor converter circuit that is coupled to a pre-balance circuit, consistent with another illustrative embodiment.

Reference now is made to FIG. 3A, which is a switched capacitor converter circuit 301 that is coupled to a pre-balance circuit 330, consistent with another illustrative embodiment. The components of the switched capacitor converter circuit 301 are similar to those of the switched capacitor converter circuit 201 and are therefore not discussed in substantial detail. In one embodiment, the switched capacitor converter circuit 301 may include an additional output capacitor $C_{OPT}$ 370 coupled between a terminal of the input voltage $V_{IN}$ 302 and the output capacitor $C_{OUT}$ 314 for better charge sharing and efficiency. As used herein, the term efficiency relates to the amount of input power is used to get a certain amount of power. For example, for a 100% efficient system, there are no losses and the input power used is the same as the output power. The capacitor $C_{OPT}$ 370 provides an additional path in transferring charge to the output capacitor $C_{OUT}$, thereby reducing the amount of current flowing through the transistors. As a capacitor has lower effective resistance than the power transistors, it therefore has lower losses.

When the switched capacitor converter circuit 301 is configured to be operated as a voltage divider charge pump, as illustrated in FIG. 3A, the pre-balance circuit can be further simplified. For example, pre-balance circuit 330 may use a single current source 360 to charge or discharge the two capacitors $C_{FLY}$ 304 and $C_{OUT}$ 328 at the same time.

The pre-balance circuit 330 includes a voltage divider comprising a first resistance element 342 and a second resistance element 346 connected in series. The ratio of the first resistance element 342 to the second resistance element 346 may differ based on the voltage division to be achieved by the switched capacitor converter circuit 301. The voltage divider is configured to sample the input voltage $V_{IN}$ 302 and provide a scaled version thereof at node 344.

The pre-balance circuit 330 also includes a pair of comparators 332 and 338 that are configured to compare the voltage across the capacitor $C_{OUT}$ 314 with the reference voltage of the node 344. The operation of the pair of comparators 332 and 338 is similar to that of comparators 252 and 258 of FIG. 2 and is therefore not discussed in detail for brevity.

The pre-balance circuit 330 is able to perform the pre-balancing without the use of the additional circuitry of the pre-balance circuit 230 of FIG. 2, by virtue of a specific timing of activation and deactivation of the transistors Q1 to Q4 (306 to 312) during a capacitor ($C_{OUT}$) voltage pre-balance phase. For example, during such phase, transistors Q2 and Q4 (308 and 312) are turned ON (represented by shorted wires) while transistors Q1 and Q3 (306 and 310) are turned OFF (represented by gaps and a drain to source diode connection), as illustrated in FIG. 3A.

Before turning ON transistors Q2 308 and Q4 312, the node SW1 is pulled to a level substantially similar to $V_{OUT}$ 328, and the node SW2 is pulled down to a level substantially similar to GND. In one embodiment, two current sources may be used to pull the node SW1 to GND and the node SW2 to GND separately, or two resistance elements may be connected from node SW1 to GND and node SW2 to GND separately to pull these two nodes down. When transistors Q2 308 and Q4 312 are then turned ON, capacitors $C_{FLY}$ 304 and $C_{OUT}$ 314 are connected in parallel and the voltage across them is the same. The pre-balance circuit 330 charges or discharges the capacitors $C_{FLY}$ 304 and $C_{OUT}$ 314 simultaneously if the voltage sensed across the output capacitor $C_{OUT}$ 314 is not within a predetermined tolerance, as defined by the hysteresis voltage sources 334 and 336. Alternately, if $C_{FLY}$ 304 is not required to be balanced as precise as capacitor $C_{OUT}$ 314, the pre-balance may be done with only transistor Q4 312 being ON (while transistor Q2

308 is OFF) for simplicity. In such a scenario, the capacitor $C_{FLY}$ 304 may be charged up by the pre-balance circuit 330 through the body diode of Q2. The voltage on the $C_{FLY}$ capacitor 304 is one diode voltage drop (e.g., approximately 0.7V) lower than the voltage on the output capacitor $C_{OUT}$ 314.

Figure 3B:
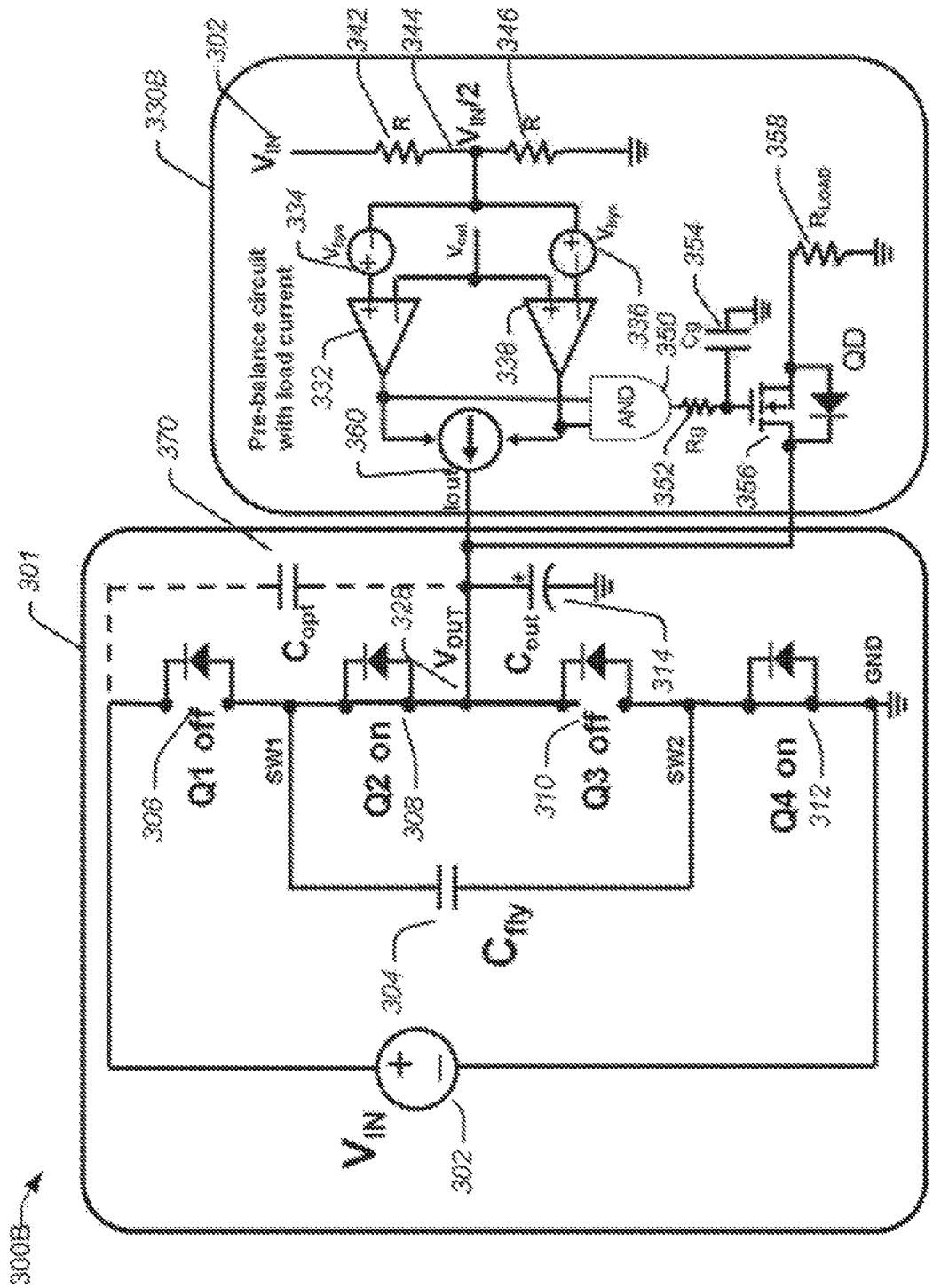
FIG. 3B is a switched capacitor converter circuit that is coupled to another pre-balance circuit, consistent with an Illustrative embodiment.

FIG. 3B is a switched capacitor converter circuit that is coupled to another pre-balance circuit, consistent with illustrative embodiment. The components of switched capacitor converter circuit 301 and some of the components of the pre-balance circuit 330B are similar to those of FIG. 3A and are therefore not repeated here for brevity.

The pre-balance circuit 330B can perform pre-balancing with load current on the output of the switched capacitor converter 301. If the load current through $R_{LOAD}$ 358 is much less than the current source 360 (e.g., at least 10 time smaller), the current source 360 over-drives the small load current and performs balancing as normal. However, if the load current is comparable or larger than the current source 360, a disconnect FET DQ 356 is used to disconnect the load current during pre-balancing. In the example of FIG. 3B, the outputs of the two comparators 332 338 are connected to an logic gate 350, (which, in one embodiment may be an AND gate). The output of the logic gate 350 controls the gate of the disconnect FET QD 356 through an optional RC filter. For example, there is a series resistance element Rg 352 coupled in series between the logic gate 350 and the gate of the disconnect FET QD 356. There is also a capacitance element Cg 354 coupled between the gate of the disconnect FET QD 356 and ground. The RC filter provided by Rg 352 and Cg 354 may be selected based on the desired delay and speed of turning ON the Disconnect FET QD 356 to meet the requirements of different applications.

The output of the logic gate 350 is high only when the outputs of both comparators 332 and 328 are high. Accordingly, $V_{OUT}$ is within the predetermined tolerance defined by the hysteresis voltage sources 334 and 338. The logic gate 350 is supplied by a voltage source high enough to turn ON the disconnect FET QD. With the disconnect FET QD 356, the pre-balancing may be performed in the same way as no load conditions and the load current is applied only after pre-balancing is finished.

Figure 4:
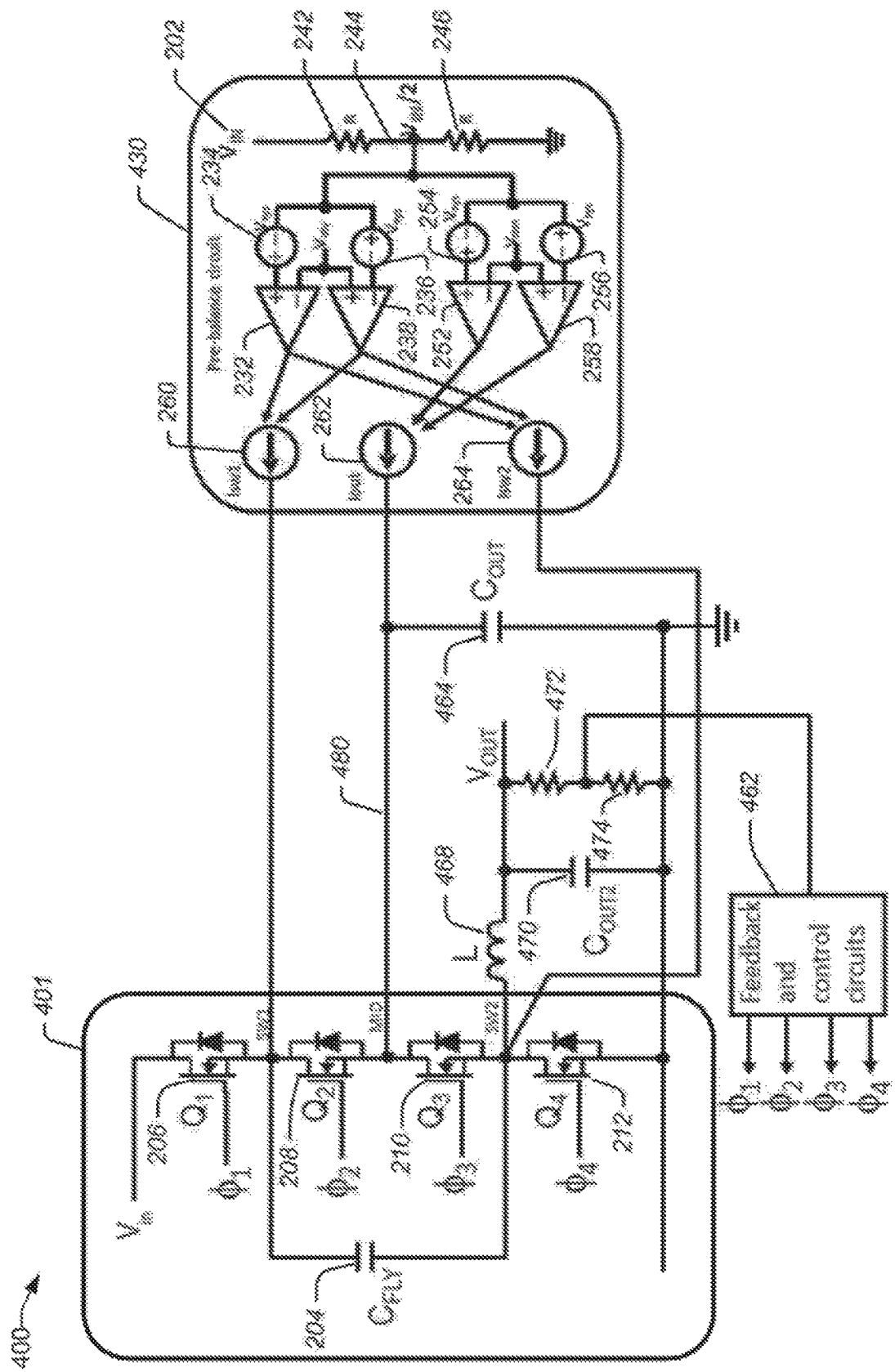
FIG. 4 is a switched capacitor converter circuit with a buck topology that is coupled to a pre-balance circuit, consistent with an illustrative embodiment.

Still further, the concepts discussed herein can be used together with various types of DC to DC voltage converters, such as buck, boost, and buck-boost. To that end, FIG. 4 illustrates by way of illustrative example a switched capacitor converter circuit 401 with a buck topology that is coupled to a pre-balance circuit 430, consistent with an exemplary embodiment. The pre-balance circuit 430 is substantially similar to the pre-balance circuit 230 of FIG. 2. Similarly, the switched capacitor converter circuit 401 is substantially similar to the switched capacitor converter circuit 201 of FIG. 2. These blocks are therefore not repeated here for brevity.

The architecture 400 includes an output capacitor $C_{OUT}$ 464 that is coupled between node 480 and GND. There is an inductor L 468 coupled between node SW2 and the output node $V_{OUT}$. There is a second capacitor $C_{OUT2}$ 470 coupled, between $V_{OUT}$ and GND. There are two resistance elements 472 and 474 coupled in series between $V_{OUT}$ and GND. There is a feedback and control circuit 462 coupled to the interface between the first resistance element 472 and the second resistance element 474.

In one embodiment, by setting the amplitude of current sources Isw1 260 and Isw2 264 to be substantially similar, the hybrid buck converter is allowed to startup into a pre-biased output condition without charging or discharging the output voltage $V_{OUT}$.

CONCLUSION

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, any signal discussed herein may be scaled, buffered, scaled and buffered, converted to another mode (e.g., voltage, current, charge, time, etc.), or converted to another state (e.g., from HIGH to LOW and LOW to HIGH) without materially changing the underlying control method.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently. For example, bipolar transistors (e.g., PNP or NPN) or junction gate field-effect transistors (JFET) can be used instead of MOS transistors. A PNP may be used instead of NPN, and a PMOS may be used instead of NMOS.

Unless otherwise stated, all measurements, values, ratings, positions, magnitudes, sizes, and other specifications that are set forth in this specification, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

All articles, patents, patent applications, and other publications that have been cited in this disclosure are incorporated herein by reference.

It will be understood that the terms and expressions used herein have the ordinary meaning as is accorded to such terms and expressions with respect to their corresponding respective areas of inquiry and study except where specific meanings have otherwise been set forth herein. Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A pre-balancing circuit for controlling a switched capacitor converter, comprising:
   one or more comparator circuits configured to monitor a first voltage across a first capacitor and to activate one or more current sources connected to the first capacitor until the first voltage is within the tolerance range, in response to the first voltage not within a tolerance range relative to a reference level,
   wherein the one or more current sources are configured todraw a first current from, or provide a second current to, the first capacitor of the switched capacitor converter.

2. The pre-balancing circuit of claim 1, wherein the one or more current sources comprise first and second current sources, wherein the first capacitor is a flying capacitor, and wherein the one or more comparator circuits comprise:
   a first comparator circuit coupled to the a first current source and a second current source, the first comparator circuit being configured to control first and second current sources such that, responsive to the first voltage across the flying capacitor being above a first threshold voltage, the first current source draws the first current from a first terminal of the flying capacitor of the switched capacitor converter, and the second current source provides the second current to a second terminal of the flying capacitor.

3. The pre-balancing circuit of claim 2, wherein the first comparator circuit is further configured to:
   control the first and second current sources such that, responsive to the first voltage across the flying capacitor being below a second threshold voltage, the first current source provides the first current to the first terminal of the flying capacitor, and the second current source draws the second current from the second terminal of the flying capacitor; and
   turn off the first and second current sources upon determining that the first voltage across the flying capacitor is above the second threshold voltage and below the first threshold voltage.

4. The pre-balancing circuit of claim 2, further wherein the one or more comparator circuits further comprise:
   a second comparator configured to control a third current source such that:
   the third current source draws a third current from an output capacitor of the switched capacitor converter responsive to a second voltage across the output capacitor being above a third threshold voltage;
   the third current source provides a fourth current to the output capacitor responsive to the voltage across the output capacitor being below a fourth threshold voltage; and
   the third current source is turned off responsive to the voltage across the output capacitor being below the third threshold voltage and above the fourth threshold voltage.

5. The pre-balancing circuit of claim 1, wherein each comparator circuit comprises a first comparator device and a second comparator device,
   the first comparator device configured to monitor a first voltage across the first capacitor and to activate a first current source connected to the first capacitor to draw the first current from the first capacitor until the charge of the first capacitor satisfies the first threshold charge level in response to the first voltage exceeding a first tolerance above the reference level; and
   the second comparator device configured to monitor the first voltage and to activate a second current source connected to the first capacitor to provide the second current to the first capacitor until the first voltage satisfies the second tolerance in response to the first voltage exceeding a second tolerance below the reference level, wherein the tolerance range is defined as being between the first tolerance and the second tolerance.

6. The pre-balancing circuit of claim 5, further comprising:
   a voltage divider circuit configured to receive an input voltage provided at an input node of the switched capacitor converter and to provide the reference level based on a function of the input voltage.

7. The pre-balancing circuit of claim 6, wherein the voltage divider circuit comprises:
   a first resistance element coupled to the input node of the switched capacitor converter; and
   a second resistance element coupled between the first resistance element, at a second node opposite the input node, and a ground, wherein the first resistance element is operative to provide the reference level at the second node.

8. The pre-balancing circuit of claim 6, wherein a difference in magnitude between the first tolerance and the reference level is substantially equal to a difference in magnitude between the second tolerance and the reference level.

9. The pre-balancing circuit of claim 6, wherein the first capacitor is an output capacitor connected at an output node of the switched capacitor converter, wherein the switching capacitor converter comprises:
   a plurality of transistors, wherein a flying capacitor is connected between a first node linking load current paths of a first two serially connected transistors of the plurality of transistors and a second node linking load current paths of a second two serially connected transistors of the plurality of transistors; and
   a third capacitor coupled between the input node and the output capacitor.

10. The pre-balancing circuit of claim 2, wherein the switching capacitor converter comprises:
    a plurality of transistors, wherein the flying capacitor is connected between a first node linking load current paths of a first two serially connected transistors of the plurality of transistors and a second node linking load current paths of a second two serially connected transistors of the plurality of transistors, wherein the plurality of transistors are placed in a disabled state in response to an enabled state of the one or more comparator circuits.

11. A pre-balancing circuit for controlling a switched capacitor converter, comprising;
   a first comparator circuit coupled to a first current source and configured to control the first current source such that:
   the first current source draws a first current from an output capacitor of the switched capacitor converter responsive to a voltage across the output capacitor being above a first threshold voltage;
   the first current source provides a second current to the output capacitor responsive to the voltage across the output capacitor being below a second threshold voltage, and
   the first current source is turned off responsive to the voltage across the output capacitor being below the first threshold voltage and above the second threshold voltage.

12. The pre-balancing circuit of claim 11, further comprising a second comparator circuit coupled to a second current source and a third current source, the second comparator circuit being configured to:
   control the second and third current sources such that the second current source draws a second current from a first terminal of a flying capacitor of the switched capacitor converter, and the third current source provides a third current to a second terminal of the flying capacitor responsive to a voltage across the flying capacitor being above a third threshold voltage;
   control the second and third current sources such that the second current source provides the second current to the first terminal of the flying capacitor, and the third current source draws the third current from the second terminal of the flying capacitor responsive to the voltage across the flying capacitor being below a fourth threshold voltage; and
   turn off the second and third current sources being the voltage across the flying capacitor being above the fourth threshold voltage and below the third threshold voltage.

13. The pre-balancing circuit of claim 12, wherein the first comparator circuit is further configured to control the first current source such that the flying capacitor and the output capacitor are charged or discharged simultaneously upon determining that the voltage across the output capacitor is not within a predetermined voltage range based on the first and second threshold voltages.

14. The pre-balancing circuit of claim 13, wherein the switching capacitor converter comprises:
   a plurality of transistors, wherein the flying capacitor is connected between a first node linking load current paths of a first two serially connected transistors of the plurality of transistors and a second node linking load current paths of a second two serially connected transistors of the plurality of transistors,
   wherein, in response to an enabled state of the first comparator circuit, one of the first two serially connected transistors and one of the second two serially connected transistors placed in a disabled state, and the other of the first two serially connected transistors and the other of the second two serially connected transistors are placed in an enabled state, such that the output capacitor and the flying capacitor are placed in parallel.

15. The pre-balancing circuit of claim 11, wherein the first comparator circuit comprises:
   a first comparator device configured to monitor the voltage across the output capacitor and to activate the first current source to draw the first current from the output capacitor until the voltage across the output capacitor is below the first threshold voltage in response to the voltage across the output capacitor exceeding the first threshold voltage; and
   a second comparator device configured to monitor the voltage across the output capacitor and to activate the first current source to provide the second current to the output capacitor until the voltage across the output capacitor is above the second threshold voltage in response to the voltage across the output capacitor below the second threshold voltage.

16. The pre-balancing circuit of claim 11, further comprising:
   a voltage divider circuit configured to receive an input voltage provided at an input node of the switched capacitor converter and to provide a reference voltage based on a function of the input voltage,
   wherein the voltage divider circuit comprises:
   a first resistance element coupled to the input node of the switched capacitor converter; and
   a second resistance element coupled between the first resistance element, at a second node opposite the input node, and a ground, wherein the first resistance element is operative to provide the reference voltage at the second node,
   wherein the first threshold voltage and the second threshold voltage are generated based on the reference voltage.

17. The pre-balancing circuit of claim 11, wherein the switching capacitor converter comprises:
   a plurality of transistors, wherein a flying capacitor is connected between a first node linking load current paths of a first two serially connected transistors of the plurality of transistors and a second node linking load current paths of a second two serially connected transistors of the plurality of transistors, a first transistor of the first two serially connected transistors being connected to ground,
   wherein each transistor of the plurality of transistors comprises a body diode, and wherein, in response to the voltage across the output capacitor below a second threshold, the first transistor is configured to switch on to connect the flying capacitor to ground while the other transistors of the plurality of transistors are configured to switched off, and the first current source is configured to provide the second current to the output capacitor to the output capacitor to charge the output capacitor and, through a respective body diode of one of the second two serially connected transistors, to the flying capacitor to charge the flying capacitor.

18. A method of controlling a switched capacitor converter having a flying capacitor and an output capacitor, the method comprising:
   placing the switched capacitor converter in a pre-balancing mode herein switching of one or more transistors of the switched capacitor converter is disabled;
   determining a first voltage level of the flying capacitor in response to the pre-balancing mode of the switched capacitor converter;
   responsive to the determined first voltage level being above a first threshold voltage, drawing, using a first current source, a first current from the flying capacitor;
   responsive to the first voltage level being below a second threshold voltage, providing, using a second current source, a second current to the flying capacitor; and
   responsive to the first voltage level across the flying capacitor being above the second threshold voltage and below the first threshold voltage, turning off the first and second current sources.

19. The method of claim 18, further comprising:
determining a second voltage level of the output capacitor in response to the pre-balancing mode of the switched capacitor converter;
responsive to the second voltage level is above a third threshold voltage; drawing, using a third current source, a third current from a first terminal of the output capacitor,
responsive to the determined second voltage level is below a fourth threshold voltage, providing, using the third current source; a fourth current to the output capacitor; and
responsive to the determined second voltage level being below the third threshold voltage and above the fourth threshold voltage; turning off the third current source.

20. The method of claim 19, further comprising:
determining an input voltage provided to the switched capacitor converter;
generating, based on the input voltage, a scaled voltage representative of the input voltage; and
generating the first, second, third, and fourth threshold voltages based on a function of the scaled voltage and one or more offset voltages.

* * * * *